United States Patent
Khandelwal et al.

(10) Patent No.: US 11,256,688 B2
(45) Date of Patent: Feb. 22, 2022

(54) SYSTEM AND METHOD FOR QUERYING A DATA STRUCTURE

(71) Applicant: Intellicus Technologies Pvt. Ltd., Indore (IN)

(72) Inventors: Ankit Khandelwal, Indore (IN); Kapil Ghodawat, Indore (IN); Sajal Rastogi, Indore (IN)

(73) Assignee: INTELLICUS TECHNOLOGIES PVT. LTD.

( * ) Notice: Subject to any disclaimer, the term of this patent is extended or adjusted under 35 U.S.C. 154(b) by 14 days.

(21) Appl. No.: 16/945,236

(22) Filed: Jul. 31, 2020

(65) Prior Publication Data

US 2021/0034609 A1 Feb. 4, 2021

(30) Foreign Application Priority Data

Aug. 2, 2019 (IN) .............................. 201921031427

(51) Int. Cl.
| | |
|---|---|
| *G06F 16/24* | (2019.01) |
| *G06F 16/245* | (2019.01) |
| *G06F 16/28* | (2019.01) |
| *G06F 16/22* | (2019.01) |

(52) U.S. Cl.
CPC .......... *G06F 16/245* (2019.01); *G06F 16/285* (2019.01); *G06F 16/2264* (2019.01)

(58) Field of Classification Search
CPC .... G06F 16/245; G06F 16/285; G06F 16/283; G06F 16/2264
See application file for complete search history.

(56) References Cited

U.S. PATENT DOCUMENTS

| | | | | |
|---|---|---|---|---|
| 10,019,472 | B2* | 7/2018 | Khandelwal | G06F 16/283 |
| 2003/0126143 | A1* | 7/2003 | Roussopoulos | G06F 16/283 |
| 2016/0048560 | A1* | 2/2016 | Khandelwal | G06F 16/283 |
| | | | | 707/634 |
| 2016/0048572 | A1* | 2/2016 | Khandelwal | G06F 16/283 |
| | | | | 707/604 |
| 2017/0300516 | A1* | 10/2017 | Khandelwal | G06F 16/211 |

OTHER PUBLICATIONS

Yin, Ying et al., Research on Data Cube Technology of Dwarf based Semantic OLAP, 2009 International Conference of Future BioMedical Information Engineering. (Year: 2009).*

* cited by examiner

*Primary Examiner* — Alicia M Willoughby
(74) *Attorney, Agent, or Firm* — Hayes Soloway P.C.

(57) ABSTRACT

The present subject matter discloses system and method for querying a dwarf cube. The method comprises receiving a query for retrieving data from a dwarf cube comprising a set of dwarf nodes. The dwarf nodes are clustered based on group by views and a dimension index is assigned for each dwarf node. The query is processed through the clustered dwarf nodes. One or more group by views of the query is determined based on dimensions and hierarchy levels associated with the query. The clustered dwarf nodes to be searched for the query are identified according to the group by views of the query. The clustered dwarf nodes are read from the views based on the identifying. The dimension index is utilized for determining a relationship between values of different dimensions queried for the reading. The response towards the query is generated.

10 Claims, 6 Drawing Sheets

SYSTEM AND METHOD FOR QUERYING A DATA STRUCTURE

CROSS-REFERENCE TO RELATED APPLICATIONS AND PRIORITY

The present application claims priority from Indian provisional patent application no. 201921031427 filed on $2^{nd}$ Aug. 2019 the entirely of which is hereby incorporated by reference.

TECHNICAL FIELD

The present subject matter described herein, in general, relates to field of data structures, and more particularly to, a system and a method for querying a data structure.

BACKGROUND

Dwarf structure is a highly compressed data structure used for querying data based on finding prefix and suffix redundancies in high dimensional data. Each of the prefix and suffix redundancies fuse exponential sizes of high dimensional cubes into a dramatically condensed lossless store.

However, with large number of dimensions, the cube size becomes too large and querying a subset of dimensions from such dwarf cubes requires reading of dwarf nodes of non-queried dimensions also. This leads to too many random and redundant reads. Such random and redundant needs may lead to an inferior query performance.

It is to be noted that in a dwarf cube, one or more aggregates are stored with leaf nodes, and in order to reach to the leaf node, a dwarf structure needs to traverse all dimension nodes from a root node to the leaf node. If the number of dimensions increases, the dwarf structure must travel large number of nodes to reach the leaf node from the root node. In this case, a dwarf cube built for N dimensions requires to travel at least N nodes to serve any query irrespective of the number of dimensions used in the query.

SUMMARY

Before the present systems and methods for querying a data structure, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for querying a data structure are further described below in the detailed description. This summary is not intended to identify essential features of the claimed subject matter nor is it intended for use in determining or limiting the scope of the claimed subject matter.

In one implementation, a method for querying a dwarf cube is disclosed. In one embodiment, the method may comprise receiving a query for retrieving data from a dwarf cube. The dwarf cube may comprise a set of dwarf nodes. Further, the dwarf cube may be structured by clustering one or more dwarf nodes from the set of dwarf nodes based on group by views and assigning a dimension index for each dwarf node. The dimension index for a dwarf node may indicate a dimension having a member value change causing closure of the dwarf node. The method may further comprise processing the query through the one or more clustered dwarf nodes. The query may comprise one or more dimensions associated with the dwarf cube. Further, the processing may comprise determining, one or more group by views for the query based on the one or more dimensions and one or more hierarchy levels associated with the query. The method may further comprise identifying, the one or more clustered dwarf nodes to be searched for the query according to the one or more determined group by views. The method may further comprise reading, the one or more clustered dwarf nodes from the one or more group by views based on the identifying. Further, the reading may comprise referring to the dimension index associated with each dwarf node from the one or more clustered dwarf nodes. The method may further comprise utilizing the dimension index for determining a relationship between values of different dimensions queried for the reading. The method may further comprise generating the response towards the query. The response may comprise one or more records created using the identified relationship between values of different dimensions.

In another implementation, a system for querying a dwarf cube is disclosed. The system may comprise a processor and a memory coupled to the processor, and the processor may execute instructions stored in the memory. In one embodiment, the set of instructions may be configured for receiving a query for retrieving data from a dwarf cube. The dwarf cube may comprise a set of dwarf nodes. Further, the dwarf cube is structured by clustering, one or more dwarf nodes from the set of dwarf nodes based on group by views and assigning a dimension index for each dwarf node. The dimension index for a dwarf node may indicate a dimension having a member value change causing closure of the dwarf node. The set of instructions may be further configured for processing the query through the one or more clustered dwarf nodes. The query may comprise one or more dimensions associated with the dwarf cube. Further, the processing may comprise determining, one or more group by views for the query based on the one or more dimensions and one or more hierarchy levels associated with the query. The processing may further comprise identifying, the one or more clustered dwarf nodes to be searched for the query according to the one or more determined group by views. The processing may further comprise reading, the one or more clustered dwarf nodes from the one or more group by views based on the identifying. Further, the reading may comprise referring to the dimension index associated with each dwarf node from the one or more clustered dwarf nodes. The processing may further comprise utilizing the dimension index for determining a relationship between values of different dimensions queried for the reading. The processing may further comprise generating the response towards the query. The response may comprise one or more records created using the identified relationship between values of different dimensions.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and systems disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods for querying a data structure are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for querying a data structure is not intended to be limited to the embodiments illustrated, but is to be accorded the widest scope consistent with the principles and features described herein.

Figure 1:
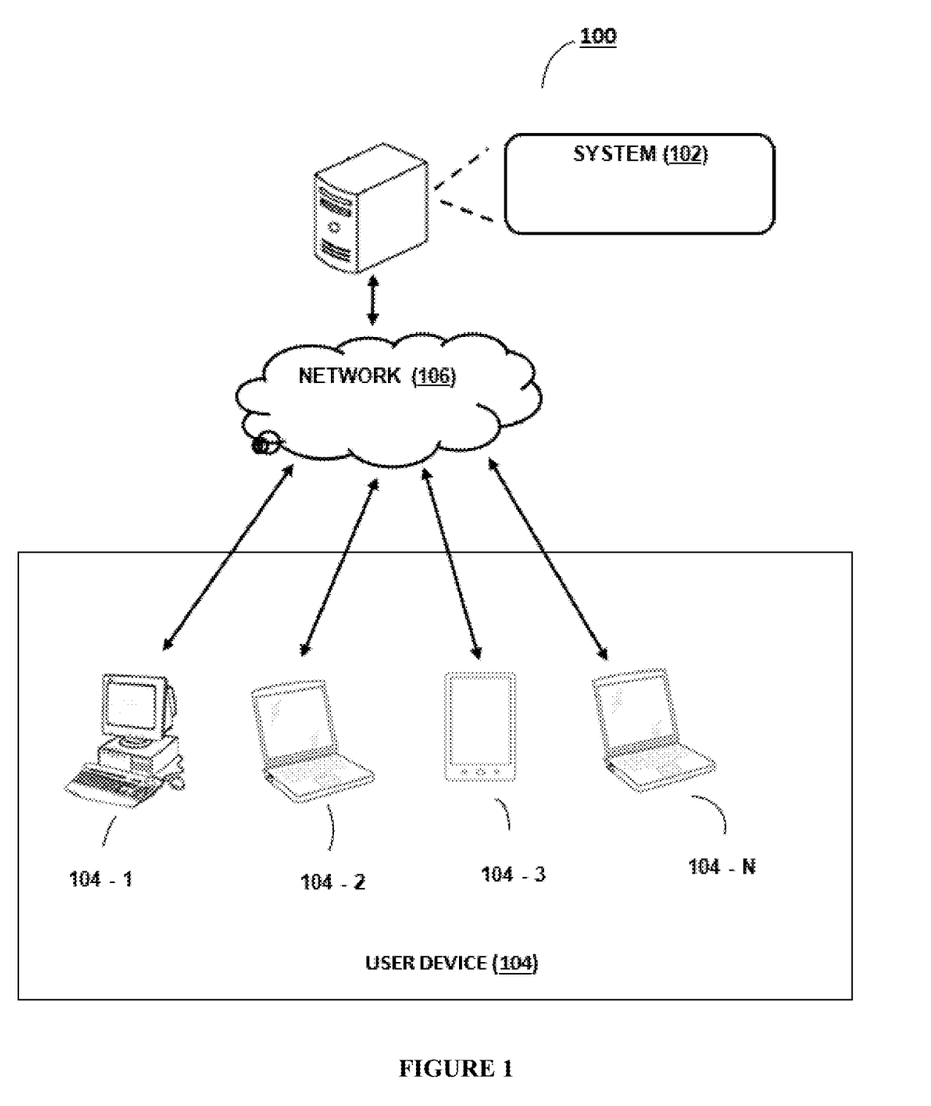
FIG. 1 illustrates a network implementation of a system for querying a dwarf cube, in accordance with an embodiment of the present subject matter.

According to various aspects of present disclosure, the system and method for querying a dwarf structure, performance of querying the dwarf structure may be improved. The performance of querying may be improved by a Selective Node Reading method that is optimal by persisting a dimension index with each dwarf node and additional meta information while building the dwarf structure. Referring to FIG. 1, a network implementation 100 of a system 102 for querying a dwarf cube is illustrated, in accordance with an embodiment of the present subject matter. Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
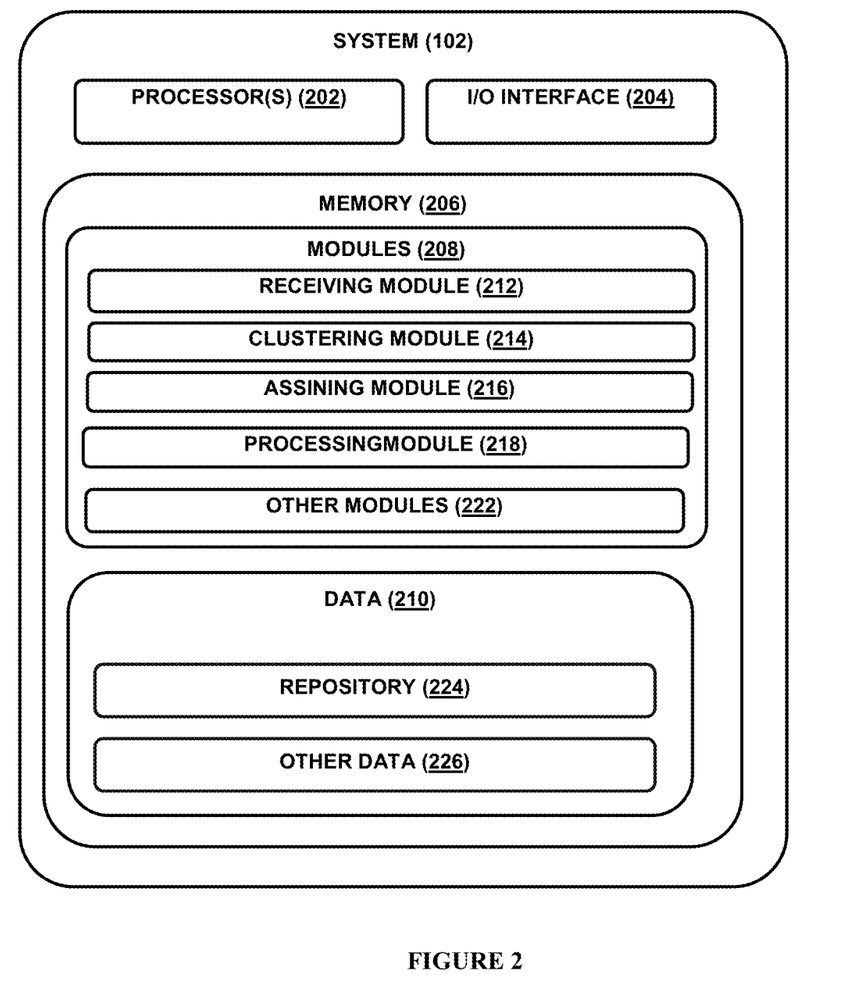
FIG. 2 illustrates the system for querying the dwarf cube, in accordance with an embodiment of the present subject matter.

Referring now to FIG. 2, the system 102 for querying a dwarf cube is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, clustering module 214, an assigning module 216, a processing module 218, and other modules 222. The other modules 222 may include programs or coded instructions that supplement applications and functions of the system 102.

The data 210, amongst other things, serves as a repository for storing data processed, received, and generated by one or more of the modules 208. The data 210 may also include repository 224 and other data 226.

In one embodiment, the receiving module 212 may receive a query from a user for retrieving data from a dwarf cube. The dwarf cube may comprise a set of dwarf nodes. The dwarf cube may represent a type of a dwarf structure.

Further, the dwarf cube may be structured by clustering one or more dwarf nodes from the set of dwarf nodes of the dwarf cube. The clustering module 214 may cluster the one or more dwarf nodes from the set of dwarf nodes based on group by views. The clustering may correspond to storing the one or more dwarf nodes, belonging to the same group by views, close to each other, which may be accessed together during a query. It is to be noted that the clustering may not require any extra iteration over input data. In one aspect, the input data may be received and sorted using the dwarf algorithm. Further, the clustering of the one or more dwarf nodes may be performed, while building the dwarf cube through single iteration of input data.

In one aspect, in order to enable the clustering, before structuring the dwarf cube, a certain amount of the memory 206 may be pre-allocated. The pre-allocated memory 206 may be fragmented into multiple fixed size blocks. Each block may be assigned a unique block number and may be associated to a "group by" view. The unique block number of each block may be sequentially assigned using a counter. During building the dwarf cube, each dwarf node, from the set of dwarf nodes, may be tagged with the "group by" view to which the dwarf node belongs. The "group by" view for a dwarf node may be determined based on one or more dimensions and one or more hierarchy levels associated with a path to reach to the node starting traversal from root node of the dwarf cube. Further, each dwarf node may be written to the pre-allocated memory block corresponding to the "group by" view of the dwarf node, when the dwarf node needs to be closed. In one aspect, if the pre-allocated memory block is full, and a newly closed dwarf node cannot be written to the pre-allocated memory block, then the pre-allocated memory block is closed and written to a physical file and a new same size block may be allocated which is associated to the same "group by" view. The new memory block may be assigned with a new block number.

Further, a newly closed dwarf node may be written to the memory block. The unique block number of the new block may be saved in the pre-allocate memory block before writing the pre-allocated memory block, that is closed, to the physical file. In other words, blocks belonging to same "group by" view forms a linked list like structure where if a block is closed, it keeps the unique block number of the newly assigned block.

Further, due to "suffix coalescing" a single dwarf node may belong to multiple group by views. In such cases the dwarf node may be present in more than one group by views. The clustering module 214 may store complete dwarf node information in one of the group by views acting as the source node, and in remaining group by views the node may be duplicated or a reference node, which points to the source node, may be created. Storing of the repeated information of the dwarf node within each Group By cluster of nodes using referenced node may increase size of the dwarf cube. In one embodiment, the dwarf node information may be repeated using referenced nodes in selected Group By views and not in the other group by views. Based on this, a Selective Node Reading method may be applied to the dwarf nodes of the selected Group By views which store all the nodes belonging to them, such as the actual node or a reference node.

Further, the assigning module 216 may assign a dimension index for each dwarf node. The dimension index may be alternatively referred as a Closure Causative Dimension Index (CCDI) for a dimension due to which the dwarf node is closed. In one aspect, the CCDI may correspond to an additional integer information stored in each dwarf node. In the aspect, the storing of the additional integer information may allow reading only those dimension nodes which are being queried.

Further, the processing module 218 may process the query through the one or more clustered dwarf nodes. The query may comprise one or more dimensions associated with the dwarf cube. The processing module 218 may determine one or more group by views based on the one or more dimensions and one or more hierarchy levels associated with the query. The one or more clustered dwarf nodes to be searched for the query may be identified according to the one or more group by views. Furthermore, the one or more clustered dwarf nodes associated with the one or more group by views may be read based on the identifying. Further, the reading may comprise referring to the dimension index associated with each dwarf node of the one or more clustered dwarf nodes. In this case, the selective node reading method may be used for reading the dwarf nodes. The selective node reading method may comprise reading the dwarf nodes that comprise the one or more dimensions as queried in the query. In one embodiment, the reading may be iterated over the one or more clustered dwarf nodes for the dimensions queried.

Further, the dimension index may be utilized for determining a relationship between values of different dimensions queried for the reading. Furthermore, the response towards the query may be generated based on the selective node reading (reading of selective one or more dwarf nodes). The response may comprise one or more records created using the identified relationship between values of different dimensions.

Figure 3A:
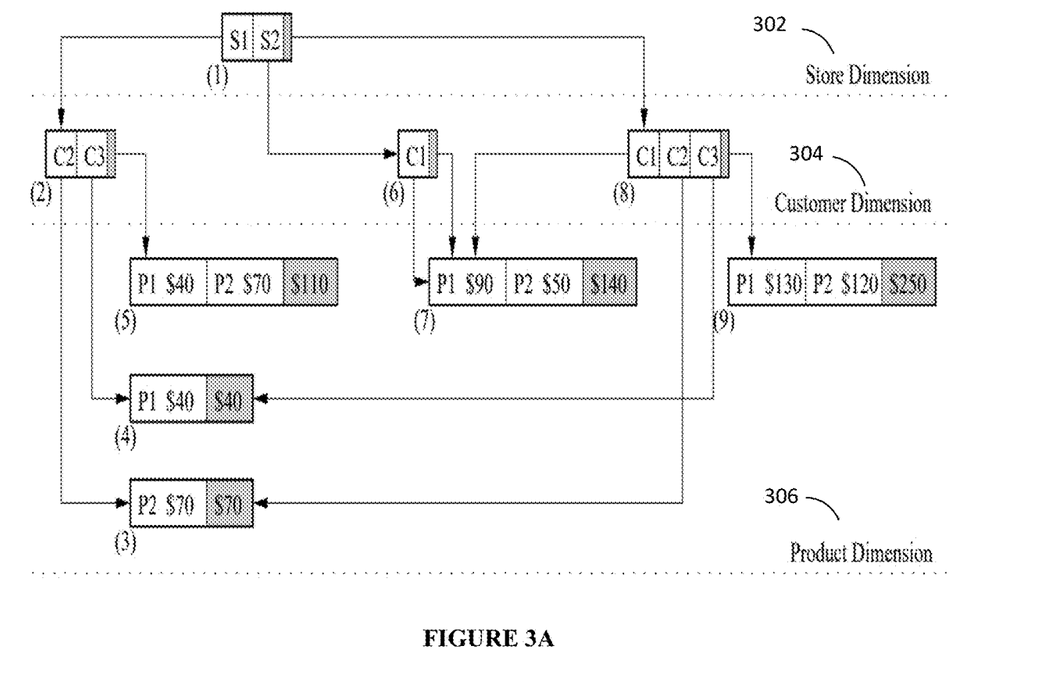
FIG. 3A illustrates an exemplary embodiment of a dwarf cube, in accordance with an embodiment of the present subject matter.
Figure 3B:
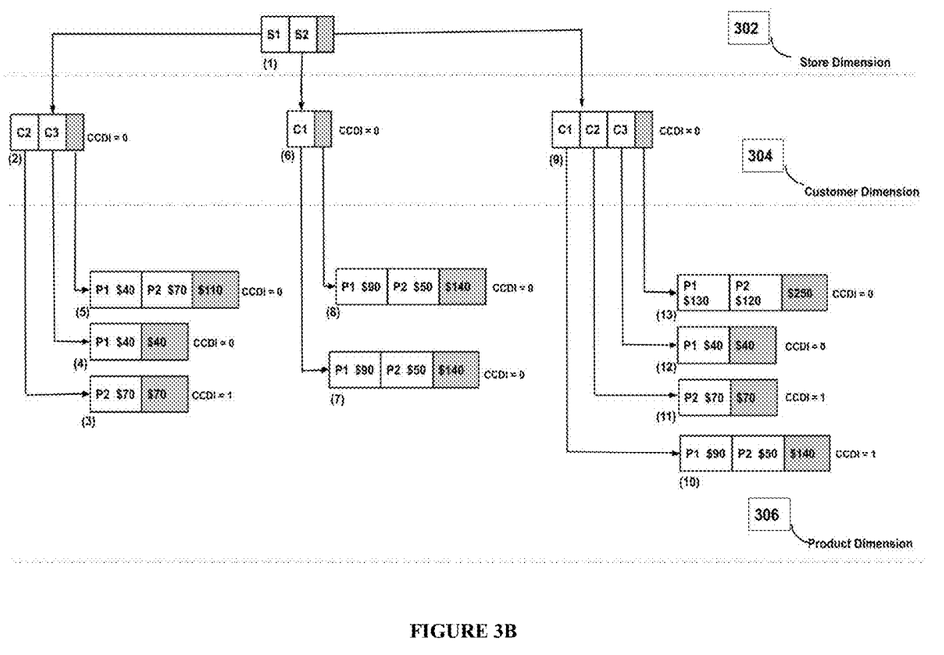
FIG. 3B illustrates an exemplary embodiment for assigning a dimension index for the dwarf node, in accordance with an embodiment of the present subject matter.
Figure 3C:
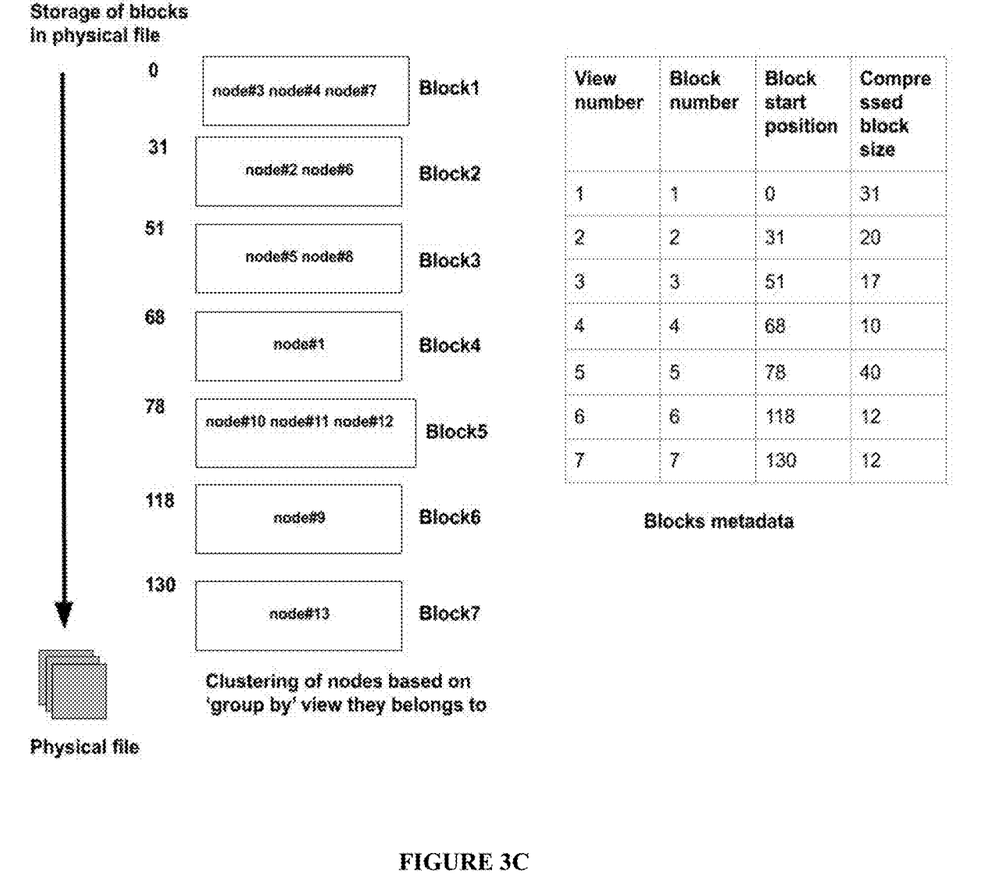
FIG. 3C illustrates an exemplary embodiment of physical storage of a dwarf node associated with the dwarf cube, in accordance with an embodiment of the present subject matter.

Referring now to FIG. 3A, an exemplary embodiment of the dwarf cube is illustrated in accordance with an embodiment of the present subject matter. Referring to FIG. 3B, an exemplary embodiment for generating a dimension index for the dwarf node is illustrated. The dimension index may be referred as Closure Causative Dimension Index (CCDI). Referring to FIG. 3C, an exemplary embodiment of physical storage of a dwarf node associated with the dwarf cube is illustrated. In one embodiment, FIG. 3A, FIG. 3B and FIG. 3C are illustrated together in order to disclose the present subject matter.

In one embodiment, construe a sample sales cube comprising three dimensions such as store 302, customer 304, and product 306. Further, data associated with the three dimensions of the sales may be as per Table 1.

TABLE 1

Fact Table for Cube Sales

| Store | Customer | Product | Sale Price |
|---|---|---|---|
| S1 | C2 | P2 | $70 |
| S1 | C3 | P1 | $40 |
| S2 | C1 | P1 | $90 |
| S2 | C1 | P2 | $50 |

In one embodiment, all aggregated values may be stored with leaf nodes which correspond to product dimension 306. Further, all paths to reach to any product dimension node 306 may require accessing the store 302 and customer dimension nodes 304.

In one example, a query i.e. Query #1 may be received. The query may correspond to "What is the product wise sales value for each store?." The query may be expressed as a {?, *, ?}. It is to be noted that all three dimensions in the query may be ordered as they appear in the dwarf cube structure. In this case, '*' may represent that dimension is not queried or in the dwarf cube structure STAR (shown as grey area in the dwarf cube in FIGS. 3A and 3B) cell needs to be queried for it. Further, '?' may represent that all members of this dimension are queried or in the dwarf cube structure all cell of this dimension nodes are to be queried.

In order to serve the query Query #1 using traditional dwarf querying approach for the dwarf cube shown in FIG. 3A, reading with root node #1 may be started where all cells of node #1 may be read. From node #1, cell S1 may be read and then following the pointer of S1 cell, further, node #2 may be read. At node #2 STAR pointer may be followed and node #5 may be read. Further, all cells of node #5 may be read. Furthermore, coming back to node #1, cell S2 may be read and then following the pointer of S2 cell, further, node #6 may be read. At node #6 STAR pointer may be followed and node #7 may be read. Further, all cells of node #7 may be read. This approach requires reading a total of 5 nodes where STAR cell from node #2 and node #6 both are read.

In the embodiment of the present subject matter, the performance of querying the dwarf cube may be improved. In the embodiment, there may exist 7 possible "group by" views for the data cube. In this case, 3.5 MB of memory is pre-allocated and the memory is fragmented into 7 blocks of half MB each, such as Block #1, Block #2, . . . Block #7. The group by views may be associated with each block as shown in Table 2A.

TABLE 2A

Various possible "Group By" view for Sales cube and Node Clustering for the dwarf cube as shown in FIG. 3A.

| Group By View | View Number | Block Number(s) | Nodes belonging to view |
|---|---|---|---|
| SCP | 1 | 1 | node#3, node#4, node#7 |
| SC* | 2 | 2 | node#2, node#6 |
| S*P | 3 | 3 | node#5, node#7 |
| S** | 4 | 4 | node#1 |
| *CP | 5 | 5 | node#7, node#3, node#4 |
| *C* | 6 | 6 | node#8 |
| **P | 7 | 7 | node#9 |

In the dwarf cube structure shown in FIG. 3A, node #2 belongs to {Store, Customer, *} group by view and similarly node #3 belongs to {Store, Customer, Product} view. When a node needs to be closed, its content is written to an in-memory block to which the node corresponds to, based on its "group by" view. Further, in the dwarf cube structure, due to "suffix coalescing" a single node can correspond to more than one "group by" views like in the table 2, node #7 belongs to 3 different "group by" views such as View #1: {Store, Customer, Product}, View #3: {Store, Product} and View #5: {Customer, Product}. In this case, View #1 is the maximal view as it has 3 dimensions while other views have only 2 dimensions. In this case, if we compute a partial dwarf cube where view #3 and view #5 are not computed and not stored in the dwarf cube structure, then the node #7 would belong to only computed view, {Store, Customer, Product}. Further, if the suffix-coalescing is turned off, then, 3 different copies of node #7 may be created where each one will belong to its corresponding view. This may increase the size of the dwarf cube structure. Thus, a new node may be created which is just a reference to its original node. The new node may be referred as a reference node. The generation of reference nodes may help to persist a Closure Causative Dimension Index (CCDI) with each node that is needed to independently read nodes from a Group By cluster of nodes while serving queries. FIG. 3B shows a Dwarf cube structure (for the same data of Table 1) where suffix coalescing is turned off.

TABLE 2B

Various possible "Group By" view for Sales cube and Node Clustering for the Dwarf cube shown in FIG. 3B where suffix-coalescing is turned off

| Group By View | View Number | Block Number(s) | Nodes belonging to view |
|---|---|---|---|
| SCP | 1 | 1 | node#3, node#4, node#7 |
| SC* | 2 | 2 | node#2, node#6 |
| S*P | 3 | 3 | node#5, node#8 |
| S** | 4 | 4 | node#1 |
| *CP | 5 | 5 | node#10, node#11, node#12 |
| *C* | 6 | 6 | node#9 |
| **P | 7 | 7 | node#13 |

Further, a dimension index alternatively referred as the Closure Causative Dimension Index (CCDI) for the dimensions may be assigned. In this case, referring to FIG. 3B, dimension #0 may indicate Store 302, dimension #1 may indicate Customer 304, and dimension #2 may indicate Product 306. In one aspect, the node #3 may be closed when the system 102 moves from C2 to C3 in node #2 of Customer dimension 304. In other words, closure of node #3 is caused by change in value of Customer dimension 304. Thus, CCDI for node #3 may be 1. Similarly, node #4, node #5 and node #2 may be closed due to change in value of Store dimension 302 from S1 to S2. Thus, the CCDI for node #4, node #5 and node #2 may be 0. Similarly, CCDI for all dwarf nodes are shown in the FIG. 3B.

Further, a Selective Node Reading method can be used to serve a query from a dwarf structure where dwarf nodes are clustered based on group by views and a closure causative dimension index is kept with each dwarf node. Referring to Table 2B and FIG. 3B, to serve the query shown in Query #1, {view #4=S**} and { view #3=S*P} as 2 views may be identified based on an analysis of the query Query #1 and an iterator may be initialized to read nodes form each identified view. Further, there exists 2 iterators, view #4_node_iterator may give node #1, and view #3_node_iterator may give node #5, and node #8. It requires reading of 3 nodes only as compared to 5 nodes as per the traditional dwarf reading method.

The system 102 may start iterating values from first iterator that results in values for store dimension. For each store value, the system 102 may read next view values which results in product dimension values and aggregates. The system 102 may further continue reading the product values until the CCDI for the product dimension indicates that there is need to move to the store dimension in order to read next product value. Further, if the CCDI for the product dimension node is equal to or less than the store dimension index, then it must break reading of the product dimension, and move next in store dimension and so on.

It is to be noted that node #1.{S1} is associated with node #5.{P1, P2}. Further, node #1.{S2} is associated with node #8.{P1, P2}. Thus, the reading of the dwarf nodes may be as shown in table 3.

TABLE 3

Selective node reading to serve Query#1

```
view#4_node_iterator
   next( ) - S1      memberValues {S1, null}
      view#3_node_iterator
         next( ) - P1 = $40 memberValues {S1, P1}Record#1:
         {S1, Pl} = $40
         next( ) - P2 = $70    memberValues {S1, P2}    Record#2:
         {S1, P2} = $70
view#4_node_iterator
   next( ) - S2      memberValues {S2, null}
      view#3_node_iterator
         next( ) - P1 = $90    memberValues {S2, P1}    Record#3:
         {S2, Pl} = $90
         next( ) = P2 = $50 memberValues {S2, P2}Record#4:
         {S2, P2} = $50
```

Based on the table 3, it is to be noted that selective node reading method may not read node #2 and node #6 which belong to Customer dimension because Customer was not queried. Thus, the selective node reading method is optimal and improves query performance in the dwarf cube structure.

Further, FIG. 3C shows physical storage of dwarf nodes associated with the dwarf cube shown in FIG. 3B. The one or more nodes from the set of nodes (node #1 to node #13) are clustered based on group by views they belong to wherein a "group by view" for a dwarf node is determined based on a path to reach to this node starting from root node of the dwarf. The pre-allocated memory 206 is fragmented into multiple blocks (Block 1 to Block 7). Each block is assigned a unique block number (Block 1 to Block 7) and is associated to a "group by" view (view number 1 to view number 7). Further, while building a dwarf structure, each dwarf node is tagged with the "group by" view and a closed dwarf node is written to the block corresponding to the "group by" view of the dwarf node. Further, the FIG. 3C shows additional block metadata such as block start position and compressed block size corresponding to the group by view and block number.

In one embodiment, the present subject matter provides improvement in query performance based on clustering and selective node reading methods. Further, cost required for computing a dimension combination which is "not a pre-aggregated combination in dwarf structure", is reduced drastically due to optimized reading of the nodes.

Figure 4:
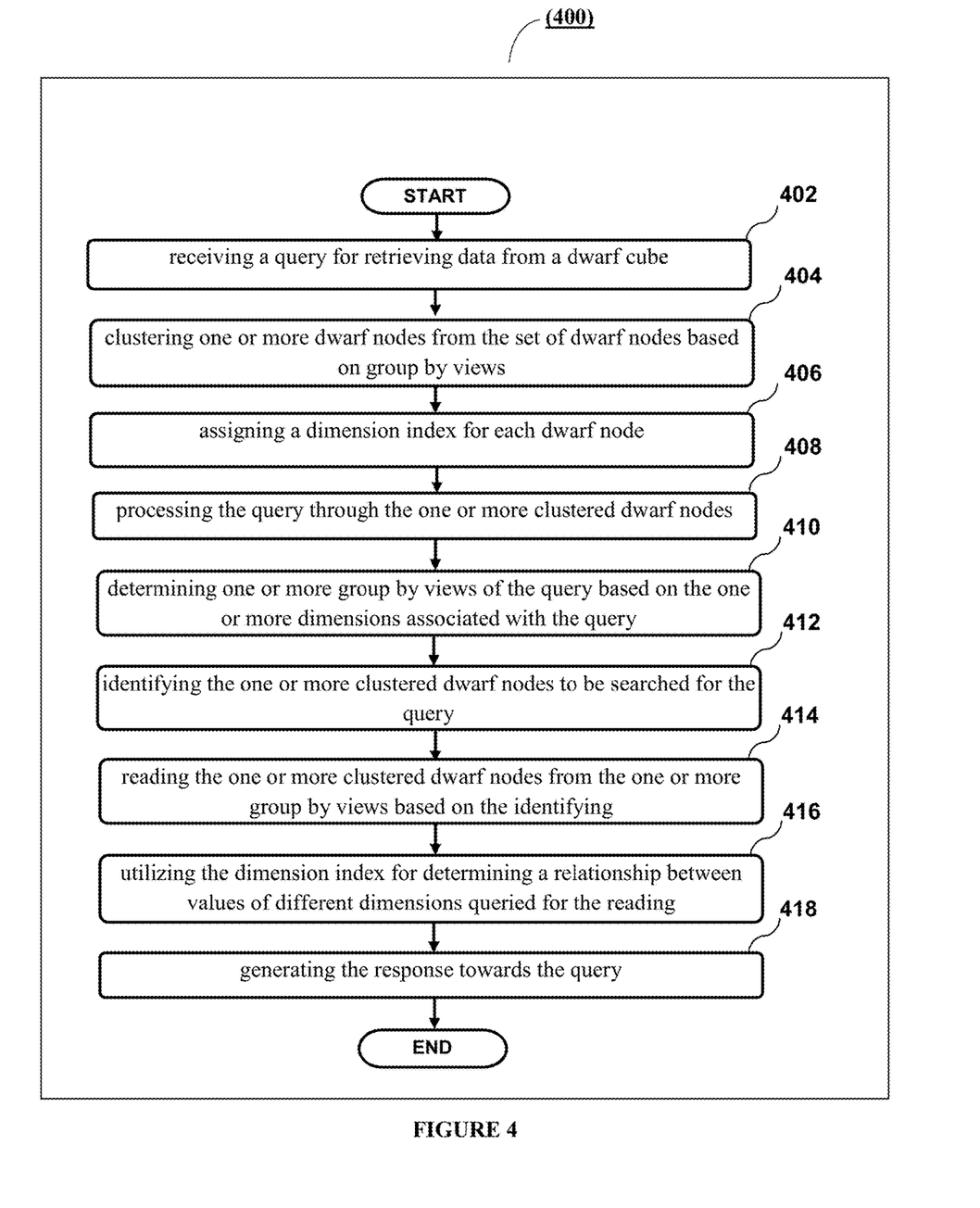
FIG. 4 illustrates a method for querying a dwarf cube, in accordance with an embodiment of the present subject matter.

Referring now to FIG. 4, a method 400 for querying a dwarf cube is illustrated in accordance with an embodiment of the present subject matter.

The method 400 may be described in the general context of computer executable instructions. Generally, computer executable instructions can include routines, programs, objects, components, data structures, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 700 or alternate methods. Additionally, individual blocks may be deleted from the method 400 without departing from the spirit and scope of the subject matter described herein. Furthermore, the method 400 can be implemented in any suitable hardware, software, firmware, or combination thereof. However, for ease of explanation, in the embodiments described below, the method 400 may be considered to be implemented in the above described system 102.

At block 402, a query may be received from a user for retrieving data from a dwarf cube. The dwarf cube may comprise a set of dwarf nodes.

At block 404, the dwarf cube may be structured by clustering one or more dwarf nodes from the set of dwarf nodes based on group by views. The group by view may store clusters belonging to a similar group by view.

Further, the clustered dwarf nodes may be clustered by using a pre-allocated memory 206. The pre-allocated memory 206 may be divided into multiple fixed size blocks for writing a dwarf node. Further, each fixed size block of the multiple fixed size blocks may be assigned with a unique block number. The unique block number may be associated with the group by view and may be used for clustering the set of dwarf nodes.

Furthermore, the dwarf node may belong to multiple group by views due to suffix coalescing. The information of the dwarf node may be complete in one group by view acting as a source node, and information of the dwarf node may be repeated in other group by view, by creating a reference node for the dwarf node pointing to the source node.

At block 406, a dimension index may be assigned for each dwarf node from the clustered dwarf. The dimension index may indicate a dimension having a member value change causing closure of the dwarf node. The dimension index may comprise a Closure Causative Dimension Index (CCDI).

At block 408, the query may be processed through the one or more clustered dwarf nodes. The query may comprise one or more dimensions associated with the dwarf cube.

At block 410, the processing may comprise determining, one or more group by views for the query based on the one or more dimensions and one or more hierarchy levels associated with the query.

At block 412, the one or more clustered dwarf nodes to be searched for the query may be identified according to the one or more group by views.

At block 414, the one or more clustered dwarf nodes may be read from the one or more group by views based on the identifying. The reading may comprise referring to the dimension index associated with each dwarf node from the one or more clustered dwarf nodes.

At block 416, the dimension index may be utilized for determining a relationship between values of different dimensions queried for the reading.

At block 418, a response towards the query may be generated based on the reading. The response may comprise one or more records created using the identified relationship between values of different dimensions.

In one exemplary embodiment, additional details on the steps executed in the method 400 for querying a dwarf structure are presented.

```
Step    1:    readFromViewsRecursively(CubeDatacubeData,
GrpByViewWiseQueryInfo query,
        Dimension[ ] orderedDimensions, int recursionIndex)
   {
               int viewNum = query.openedViews[recursionIndex];
               int          readLevelIdx          =
query.index_LevelsToRead[recursionIndex];
               int currDimIdx = query.index_DimsToRead[recursionIndex];
               Dimension currDim = orderedDimensions[currDimIdx];
               int closureCausativeDimIndex;
Step 2: do   {
   CubeNode   node   =   cubeData.getNextNodeFromView(viewNum,
currDim);
     closureCausativeDimIndex = node.getClosureCausativeDimIndex( );
         // Get cell IDs iterator on current node
         Iterator<ValidCellID>validCellIDsIterator              =
node.getCellIDIterator( );
         // Iterate all valid cell IDs for current node
   Step 3: while (validCellIDsIterator.hasNext( ))
           {
                 ValidCellIDvalidCellID = validCellIDsIterator.next( );
                 Object cellID = validCellID.getCellID( );
                 Object val = validCellID.getCellValue( );
                 // Update member values for all queries being served from
current
                 // GROPU BY view reading
   Step 4:         for(Integer queryIndex: query.getAllQueryIndexes( ))
                   {
                 GrpByViewWiseQueryInfo.QueryResultBuilder    q   =
     query.getQueryResultBuilder(queryIndex);
                 // This   method   updates   current   dim   value   in
memberValues array.
                 //  Here readLevelIdx   can   be   different   than
queriedLevelIndex so
                 // it   may   perform   parent   value   lookup.  E.g.   in   Time
dimension
                 // hierarchy we may be reading dwarf node for DAY level
while
                 // query can be for MONTH level, so it gets MONTH from
DAY.
                 updateMemberValuesArray(currDim, readLevelIdx, cellID,
                     q. memberValues, q. queriedLevelIndexes);
             }
   Step 5:      if (recursionIndex<query.openedViews.length − 1) {
      readFromViewsRecursively(cubeData, query, orderedDimensions,
                       recursionIndex + 1);
             } else {
                 // If we are at leaf node then we have measure values here
     MolapAggregates facts = (MolapAggregates) val;
                 for(Integer queryIndex: query.getAllQueryIndexes( )) {
     GrpByViewWiseQueryInfo.QueryResultBuilder q =
     query.getQueryResultBuilder(queryIndex);
                     // Prepare query wise result - Also performs aggregation for
                     // equal member values
     prepareResult(q.memberValues, acts, queryIndex);
                 }
              }
           }
         // Continue iterating current view members while current node's
         // commonPrefix (aka dim index due to which current node was
closed)
         // is not saying to move next member for parent view
       } while(recursionIndex> 0 &&closureCausativeDimIndex>
                 query.index_DimsToRead[recursionIndex−1]);
   }
```

Exemplary embodiments discussed above may provide certain advantages. Though not required to practice aspects of the disclosure, these advantages may include those provided by the following features.

Some embodiments of the system and the method are configured to improve a query performance in a dwarf structure.

Some embodiments of the system and the method are configured to reduce number of iterations of reading the nodes using a selective node reading method.

Some embodiments of the system and the method are configured to reduce the cost required for computing a dimension combination which is "not a pre-aggregated combination in dwarf structure", due to optimized reading of the nodes.

Although implementations for methods and systems for querying a data structure have been described, it is to be understood that the appended claims are not necessarily limited to the specific features or methods described. Rather, the specific features and methods are disclosed as examples of implementations for querying a data structure.

The invention claimed is:

1. A method for querying a dwarf cube, the method comprising:
receiving a query for retrieving data from a dwarf cube, wherein the dwarf cube comprises a set of dwarf nodes, and wherein the dwarf cube is structured by:
clustering one or more dwarf nodes from the set of dwarf nodes based on group by views; and
assigning a dimension index for each dwarf node, wherein the dimension index indicates a dimension having a member value change causing closure of the dwarf node;
processing the query through the one or more clustered dwarf nodes, wherein the query comprises one or more dimensions associated with the dwarf cube, and wherein the processing comprises:
determining one or more group by views for the query based on the one or more dimensions and one or more hierarchy levels associated with the query;
identifying the one or more clustered dwarf nodes to be searched for the query according to the one or more determined group by views;
reading the one or more clustered dwarf nodes from the one or more group by views based on the identifying, and wherein the reading comprises referring to the dimension index associated with each dwarf node from the one or more clustered dwarf nodes;
utilizing the dimension index to determine a relationship between values of different dimensions queried for the reading; and
generating a response towards the query, wherein the response comprises one or more records created using the identified relationship between values of different dimensions.

2. The method as claimed in claim 1, wherein the group by view stores one or more clustered dwarf nodes belonging to a similar group by view.

3. The method as claimed in claim 2, wherein the clustered dwarf nodes are clustered by using pre-allocated memory, wherein the pre-allocated memory is divided into multiple fixed size blocks for writing a dwarf node, and wherein each fixed size block of the multiple fixed size blocks is assigned with a unique block number, wherein the unique block number is associated with the group by view and is used for clustering the set of dwarf nodes.

4. The method as claimed in claim 3, wherein the dwarf node belongs to multiple group by views due to suffix coalescing.

5. The method as claimed in claim 3, wherein information of the dwarf node is complete in one group by view acting as a source node, and information of the dwarf node is repeated in other group by view, by creating a reference node for the dwarf node pointing to the source node.

6. A system for querying a dwarf cube, the system comprising:
a processor;
a memory coupled to the processor, wherein the processor is configured for executing a set of instructions stored in the memory, wherein the set of instructions are configured for:
receiving a query for retrieving data from a dwarf cube, wherein the dwarf cube comprises a set of dwarf nodes, and wherein the dwarf cube is structured by:
clustering one or more dwarf nodes from the set of dwarf nodes based on group by views; and
assigning a dimension index for each dwarf node, wherein the dimension index indicates a dimension having a member value change causing closure of the dwarf node;
processing the query through the one or more clustered dwarf nodes, wherein the query comprises one or more dimensions associated with the dwarf cube, and wherein the processing comprises:
determining one or more group by views for the query based on the one or more dimensions and one or more hierarchy levels associated with the query;
identifying the one or more clustered dwarf nodes to be searched for the query according to the one or more determined group by views;
reading the one or more clustered dwarf nodes from the one or more group by views based on the identifying, and wherein the reading comprises referring to the dimension index associated with each dwarf node from the one or more clustered dwarf nodes;
utilizing the dimension index to determine a relationship between values of different dimensions queried for the reading; and
generating a response towards the query, wherein the response comprises one or more records created using the identified relationship between values of different dimensions.

7. The system as claimed in claim 6, wherein the group by view stores the one or more clustered dwarf nodes belonging to a similar group by view.

8. The system as claimed in claim 7, wherein the clustered dwarf nodes are clustered by using pre-allocated memory, wherein the pre-allocated memory is divided into multiple fixed size blocks for writing a dwarf node, and wherein each fixed size block of the multiple fixed size blocks is assigned with a unique block number, wherein the unique block number is associated with the group by view and is used for clustering the set of dwarf nodes.

9. The system as claimed in claim 8, wherein the dwarf node belongs to multiple group by views due to suffix coalescing node.

10. The system as claimed in claim 8, wherein information of the dwarf node is complete in one group by view acting as a source node, and information of the dwarf node is repeated in other group by view, by creating a reference node for the dwarf node pointing to the source node.

* * * * *